(12) United States Patent
Sugiya et al.

(10) Patent No.: US 9,895,933 B2
(45) Date of Patent: Feb. 20, 2018

(54) NON-PNEUMATIC TIRE

(71) Applicant: SUMITOMO RUBBER INDUSTRIES, LTD., Kobe-shi, Hyogo (JP)

(72) Inventors: Makoto Sugiya, Kobe (JP); Wako Iwamura, Kobe (JP); Kazuo Asano, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 20 days.

(21) Appl. No.: 14/892,262

(22) PCT Filed: Jan. 20, 2014

(86) PCT No.: PCT/JP2014/050977
§ 371 (c)(1),
(2) Date: Nov. 19, 2015

(87) PCT Pub. No.: WO2014/199652
PCT Pub. Date: Dec. 18, 2014

(65) Prior Publication Data
US 2016/0121656 A1    May 5, 2016

(30) Foreign Application Priority Data

Jun. 11, 2013 (JP) ................................. 2013-123008

(51) Int. Cl.
*B60C 7/14* (2006.01)
*B60C 7/00* (2006.01)
(Continued)

(52) U.S. Cl.
CPC .................. *B60C 7/14* (2013.01); *B60C 7/00* (2013.01); *B60C 7/18* (2013.01); *B60C 23/19* (2013.01); *B60C 2007/146* (2013.01)

(58) Field of Classification Search
CPC .. B60C 7/00; B60C 7/14; B60C 7/143; B60C 7/18; B60C 2007/107; B60C 2007/146; B60C 23/18; B60C 23/19
(Continued)

(56) References Cited

U.S. PATENT DOCUMENTS

| 1,417,051 A | 5/1922 | Freedlander et al. |
| 1,531,056 A | 3/1925 | Wilson |

(Continued)

FOREIGN PATENT DOCUMENTS

| DE | 855810 C | 11/1952 |
| DE | 2028923 A1 | 12/1971 |

(Continued)

OTHER PUBLICATIONS

Extended European Report, dated Jan. 25, 2017, for European Application No. 14810503.4.
(Continued)

*Primary Examiner* — Kip T Kotter
(74) *Attorney, Agent, or Firm* — Birch, Stewart, Kolasch & Birch, LLP

(57) ABSTRACT

A non-pneumatic tire has high durability performance. A non-pneumatic tire is provided with: an annular tread section (2) which comes into contact with the road surface; an annular inner peripheral section (3) which is located on the inside of the tread section (2) in the radial direction of the tire; and a plurality of connection sections (4) which connect the tread section (2) and the inner peripheral section (3). The connection sections (4), the inner surface (2b) of the tread section (2), and/or the outer surface (3a) of the inner peripheral section (3) is provided with a plurality of dimples (5).

13 Claims, 9 Drawing Sheets

(51) Int. Cl.
*B60C 7/18* (2006.01)
*B60C 23/19* (2006.01)

(58) Field of Classification Search
USPC .......................................................... 152/153
See application file for complete search history.

(56) References Cited

U.S. PATENT DOCUMENTS

| | | | | |
|---|---|---|---|---|
| 1,536,023 | A | | 4/1925 | Kuhn |
| 1,557,324 | A | * | 10/1925 | Pestunowitz ............ B60O 7/12 152/325 |
| 1,616,843 | A | * | 2/1927 | Brubaker ................. B60O 7/12 152/324 |
| 1,635,194 | A | * | 7/1927 | Shively .................... B60O 7/12 152/325 |
| 4,037,635 | A | | 7/1977 | Ippen et al. |
| 4,998,980 | A | | 3/1991 | Katou |
| 5,139,066 | A | * | 8/1992 | Jarman .................... B60O 7/12 152/11 |
| 2011/0030862 | A1 | * | 2/2011 | Hayashi .............. B60C 11/0083 152/209.14 |
| 2011/0036475 | A1 | * | 2/2011 | Kojima ................... B60C 13/02 152/454 |
| 2011/0108174 | A1 | * | 5/2011 | Takahashi ............... B60C 13/02 152/153 |
| 2011/0233992 | A1 | | 9/2011 | Hino |
| 2012/0060994 | A1 | * | 3/2012 | Hayashi .............. B60C 17/0009 152/523 |
| 2012/0067475 | A1 | * | 3/2012 | Hino ....................... B60C 13/02 152/153 |
| 2012/0118466 | A1 | * | 5/2012 | Ebiko ..................... B60C 13/02 152/523 |
| 2013/0075007 | A1 | * | 3/2013 | Fujii ....................... B60C 13/02 152/523 |
| 2013/0076108 | A1 | | 3/2013 | Kubota et al. |

FOREIGN PATENT DOCUMENTS

| | | | | |
|---|---|---|---|---|
| GB | 211734 | A | * 2/1924 | ............... B60C 7/12 |
| GB | 2010755 | A | * 7/1979 | ........... B60C 13/001 |
| JP | 3-121102 | U | 12/1991 | |
| JP | 11-92804 | A | 7/1999 | |
| JP | 2007-210511 | A | 8/2007 | |
| JP | 2008-132951 | A | 6/2008 | |
| JP | 2008-302782 | A | 12/2008 | |
| JP | 2012-131254 | A | 7/2012 | |
| JP | 2013-71661 | A | 4/2013 | |
| WO | WO 03/018332 | A1 | 3/2003 | |
| WO | WO 2010/061831 | A1 | 6/2010 | |
| WO | WO 2010/143644 | A1 | 12/2010 | |

OTHER PUBLICATIONS

International Search Report, issued in PCT/JP2014/050977, dated Apr. 15, 2014.

* cited by examiner

NON-PNEUMATIC TIRE

TECHNICAL FIELD

The present invention relates to non-pneumatic tires having an excellent durability.

BACKGROUND ART

A non-pneumatic tire that comprises an annular tread portion that comes into contact with a road, an annular inner peripheral portion located radially inwardly of the tread portion and a plurality of connecting portions for connecting the tread portion with the inner peripheral portion is well known. The connecting portions, the tread portion and the inner peripheral portion are typically made of rubber or a plastic. In such a non-pneumatic tire, tensile and compressive deformation occurs repeatedly on the respective connecting portions, the tread portion and the inner peripheral portion during traveling. Thus, large elastic hysteresis loss may be generated in these components. The hysteresis loss turns to thermal energy that heats up these components. The heat tends to lower durability of the non-pneumatic tire through deterioration of the above components.

CITATION LIST

Patent Literature 1: Japanese Unexamined Patent Application Publication No. 2008-132951
Patent Literature 2: WO2003/018332
Patent Literature 3: Japanese Unexamined Patent Application Publication No. 2012-131254

SUMMARY OF INVENTION

Technical Problem

The present invention has been made in view of the above problem, and has a main object to provide a non-pneumatic tire having an excellent durability.

Solution to Problem

The first invention provides a non-pneumatic tire comprising an annular tread portion that comes into contact with a road, an annular inner peripheral portion being located radially inwardly of the tread portion, and a plurality of connecting portions connecting the tread portion with the inner peripheral portion, at least one of the connecting portions being provided with a plurality of dimples.

In another aspect of the non-pneumatic tire of the first invention, a ratio A/B of a total surface area A of the dimples to a total virtual surface area B of the connecting portions obtained by filling up all dimples is preferably in a range of from 10% to 80%.

In another aspect of the non-pneumatic tire of the first invention, the connecting portions preferably comprises a rough surface having a surface roughness of from 1 to 30 micrometer at least partially.

The second invention provides a non-pneumatic tire comprising an annular tread portion that comes into contact with a road, an annular inner peripheral portion located radially inwardly of the tread portion, and a plurality of connecting portions connecting the tread portion with the inner peripheral portion, wherein the tread portion comprises a tread inner surface facing the inner peripheral portion, and wherein the tread inner surface is provided with a plurality of dimples.

In another aspect of the non-pneumatic tire of the second invention, a ratio C/D of a total surface area C of the dimples to a total virtual surface area D of the tread inner surface obtained by filling up all dimples is preferably in a range of from 10% to 80%.

In another aspect of the non-pneumatic tire of the second invention, the tread inner surface preferably comprises a rough surface having a surface roughness of from 1 to 30 micrometer at least partially.

The third invention provides a non-pneumatic tire comprising an annular tread portion that comes into contact with a road, an annular inner peripheral portion located radially inwardly of the tread portion, and a plurality of connecting portions connecting the tread portion with the inner peripheral portion, wherein the inner peripheral portion comprises an outer surface facing the tread portion, and wherein the outer surface of the inner peripheral portion is provided with a plurality of dimples.

In another aspect of the non-pneumatic tire of the third invention, a ratio E/F of a total surface area E of the dimples to a total virtual surface area F of the outer surface of the inner peripheral portion obtained by filling up all dimples is preferably in a range of from 10% to 80%.

In another aspect of the non-pneumatic tire of the third invention, the outer surface of the inner peripheral portion preferably comprises a rough surface having a surface roughness of from 1 to 30 micrometer at least partially.

In another aspect of the non-pneumatic tire of the first to third inventions, the dimples preferably have a depth of from 0.1 to 2 mm.

In another aspect of the non-pneumatic tire of the first to third inventions, the dimples preferably have a diameter of from 1 to 20 mm.

Advantageous Effects of Invention

The non-pneumatic tire in accordance with the present invention includes an annular tread portion that comes into contact with a road, an annular inner peripheral portion located radially inwardly of the tread portion and a plurality of connecting portions connecting the tread portion with the inner peripheral portion. At least one of the connecting portions may be provided with a plurality of dimples. Thus, since the surface area of the connecting portion is increased, heat of the connecting portion may be dissipated quickly to the air. In addition, the dimples may generate turbulent flow around the connecting portions during traveling. The turbulent flow may draw heat efficiently from the connecting portions. Accordingly, the non-pneumatic tire in accordance with the present invention may exhibit an excellent durability by preventing the connecting portions from degrading due to heat generation.

Furthermore, the present invention may provide a non-pneumatic tire that includes a tread portion having a tread inner surface provided with a plurality of dimples. The non-pneumatic tire in accordance with the present invention may exhibit an excellent durability by preventing the tread portion from degrading due to heat generation. Furthermore, the present invention may provide a non-pneumatic tire that includes an inner peripheral portion having an outer surface provided with a plurality of dimples. The non-pneumatic tire in accordance with the present invention may exhibit an excellent durability by preventing the inner peripheral portion from degrading due to heat generation.

DESCRIPTION OF EMBODIMENTS

Figure 1:
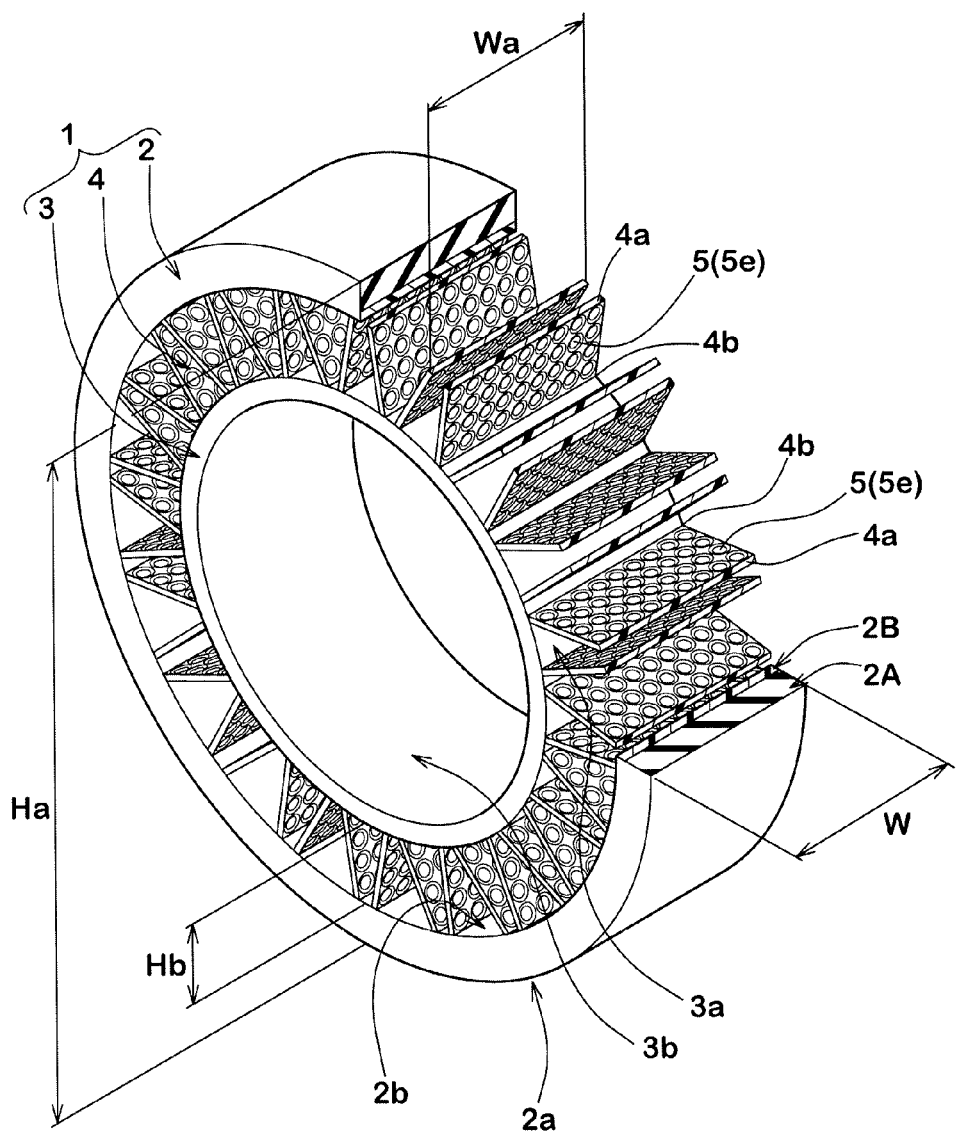
FIG. 1 is a perspective view of a non-pneumatic tire in accordance with a first embodiment of the present invention.

An embodiment of the present invention will be explained below with reference to the accompanying drawings. As shown in FIG. 1, a non-pneumatic tire (hereinafter, it may be simply referred as "tire") 1 in accordance with the present embodiment is employed for passenger cars or heavy load vehicles, for example. The non-pneumatic tire 1 may support load by its physical rigidity. Accordingly, the non-pneumatic tire 1 is different from a pneumatic tire in which compressed air is filled therein.

As shown in FIG. 1, the tire 1 includes a tread portion 2, an inner peripheral portion 3 and a plurality of connecting portions 4 connecting the tread portion 2 with the inner peripheral portion 3.

The tread portion 2 is an annular body extending continuously in a circumferential direction of the tire. The tread portion 2, for example, may have a constant axial width W. The tread portion 2, for example, includes a rubber portion 2A made of a hard rubber material and a plastic portion 2B made of a plastic material and located radially inwardly of the rubber portion 2A. The tread portion 2 includes a tread surface 2a on its radially outer surface which comes into contact with a road and a tread inner surface 2b which faces in an opposite side to the tread surface. In this embodiment, the tread surface 2a is formed of the rubber portion 2A. The tread inner surface 2b is formed of the plastic portion 2B. The rubber portion 2A, for example, is reinforced by a cord layer (not shown) having a plurality of steel or organic fiber cords.

The inner peripheral portion 3 is located radially inwardly of the tread portion 2. The inner peripheral portion 3 is an annular body extending continuously in the circumferential direction of the tire. The inner peripheral portion 3 includes an outer surface 3a facing radially outwardly and an inner surface 3b facing in an opposite side to the outer surface 3a. In this embodiment, the inner peripheral portion 3 has a constant axial width. The inner peripheral portion 3, for example, is made of a plastic material. The inner peripheral portion 3 and the tread portion 2 are arranged coaxially one another.

Figure 2:
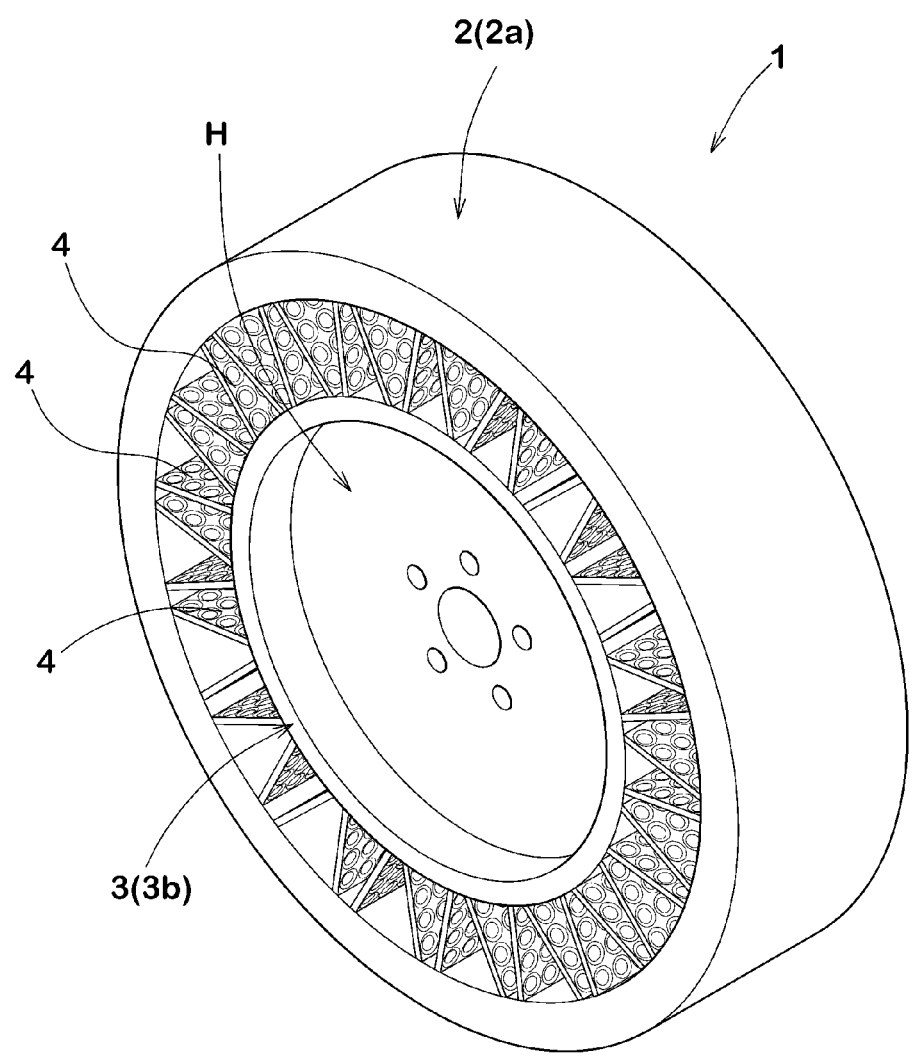
FIG. 2 is a perspective view of the non-pneumatic tire shown in FIG. 1 mounted on a wheel.

The inner peripheral portion 3 of the tire 1 may be mounted on a wheel H shown in FIG. 2, for example. The wheel H differs from a wheel rim used for pneumatic tires. In this embodiment, the inner surface 3b of the inner peripheral portion 3 is fixed to the wheel H. The wheel H is fixed to an axle (not shown) of a vehicle.

As shown in FIG. 1, each of the connecting portions 4 in accordance with the embodiment has a plate-like shape extending in an axial direction of the tire. The connecting portions 4 are arranged at a space one another in the circumferential direction of the tire. Each radially outer end 4a of the connecting portions 4 is fixed to the tread inner surface 2b of the tread portion 2. Each radially inner end 4b of the connecting portions 4 is fixed to the outer surface 3a of the inner peripheral portion 3. The connecting portions 4, for example, are inclined with respect to a radial direction of the tire. The connecting portions 4 and 4 adjacent in the circumferential direction of the tire are inclined in an opposite direction one another. When a vertical load is acted on the axle, the load is supported by tensile rigidity of the connecting portions 4 located above the axle and compressive rigidity of the connecting portions 4 located below the axle.

The radially outer end 4a and inner end 4b of the respective connecting portions 4 extend along the axial direction of the tire. The configuration of the connecting portions 4 is not particularly limited to this aspect of the embodiment. The connecting portions 4, for example, may extend in a zigzag manner in the radial direction or the circumferential direction of the tire. In another aspect of the embodiment, the connecting portions 4, for example, may has a mesh-patterned in a cross sectional view along the circumferential direction of the tire. In this embodiment, the connecting portions 4 have the same width Wa as the inner peripheral portion 3.

The connecting portions 4 are made of a rubber or plastic material. When the connecting portions 4 are made of a rubber material, the rubber material preferably has a durometer-A hardness of from 70 to 95 degrees under a temperature of 23 degrees Celsius based on JIS K6253, for example. When the connecting portions 4 is made of a plastic material, as the plastic material, urethane resin having a hardness that exhibits a sufficient load support capability is preferably employed. Such a connecting portion 4 may improve ride comfort by absorbing vibration during traveling. In this embodiment, the connecting portions 4 are made of thermosetting polyurethane resin.

Then, more specific embodiments having the structure described above will be described below as the first to third embodiments of the invention.

The First Embodiment

At least one of the connecting portions 4 is provided with a plurality of dimples 5. In this embodiment, each of the connecting portions 4 is provided with a plurality of dimples 5. Thus, since the surface area of the connecting portions 4 is increased, heat due to hysteresis loss of the connecting portions 4 may be dissipated quickly to the air. In addition, the dimples 5 may generate turbulent flow around the connecting portions during traveling. The turbulent flow may draw heat efficiently from the connecting portions 4.

Accordingly, the non-pneumatic tire 1 in accordance with the present invention may exhibit an excellent durability by preventing the connecting portions 4 from degrading due to heat generation.

In this embodiment, each dimple 5 has a circular shaped edge 5e on the outer surface 5A of the respective connecting portions 4. Such a dimple 5 may provide an excellent durability of the tire 1 while suppressing reduction in rigidity of the connecting portions 4. The air around the circular dimples 5 may be introduced into the dimples uniformly. Thus, the heat of the connecting portions 4 may be dissipated quickly to the air efficiently.

Figure 3:
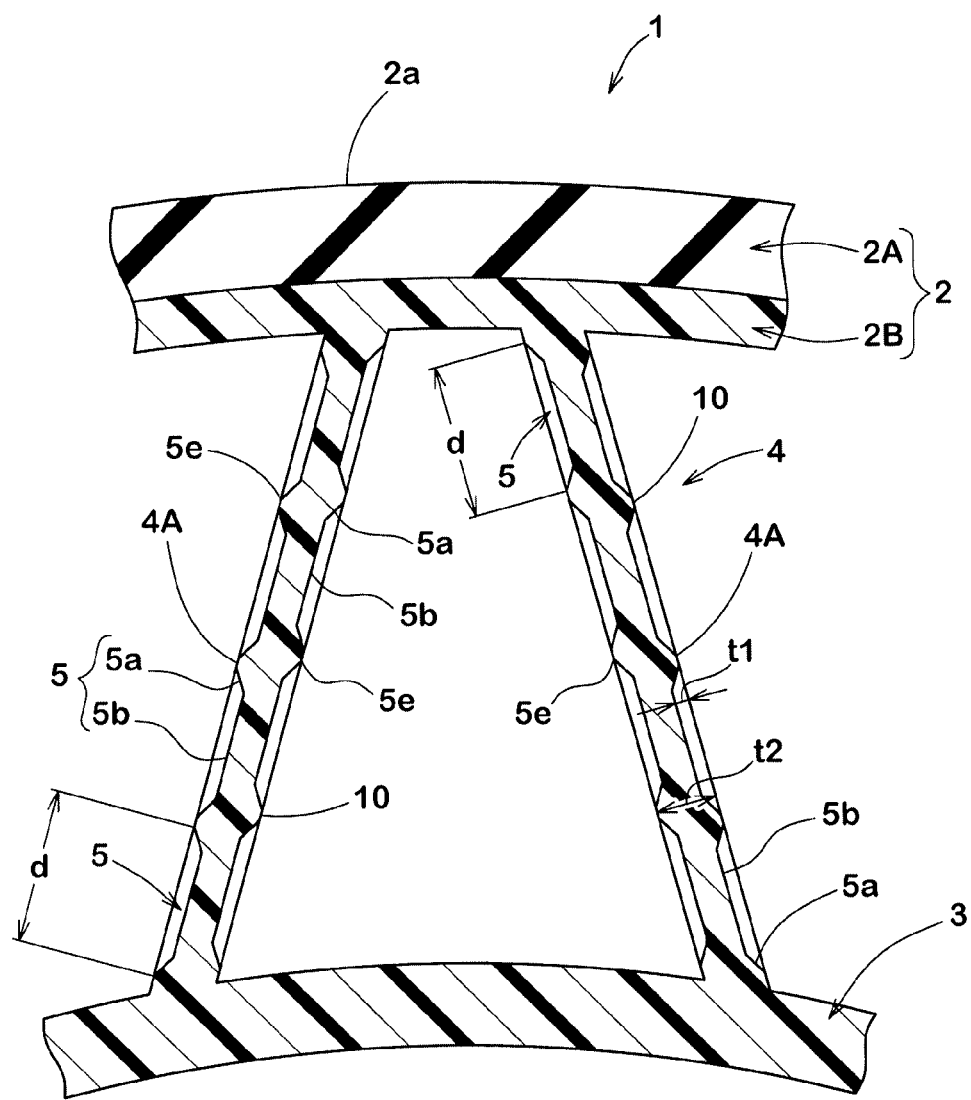
FIG. 3 is a partially enlarged cross-sectional view of the non-pneumatic tire of FIG. 1 cut along a circumferential direction of the tire.

FIG. 3 illustrates a partially enlarged cross-sectional view of the tire 1 cut along a circumferential direction of the tire. As shown in FIG. 3, the dimples 5 in accordance with the embodiment include an annular tapered sidewall 5a and a flat bottom 5b. This structure allows the air to flow toward the bottom 5b through the sidewall 5a smoothly without staying therein, and therefore heat of the connecting portions 4 may further be dissipated efficiently.

Preferably, the dimples 5 may have a diameter d of from 1 to 20 mm. When the diameter d of the dimples 5 is less than 1 mm, the air flow into the dimples 5 may be deteriorated and it may lower heat dissipation of the connecting portions 4. When the diameter d of the dimples 5 is more than 20 mm, rigidity of the connecting portions 4 reduces and it may bring deterioration in durability of the tire 1. More preferably, the diameter d of the dimples 5 is in a range of from 2 to 15 mm.

Preferably, the dimples 5 have a depth t1 in a range of from 0.1 to 2 mm. When the depth t1 of the dimples 5 is less than 0.1 mm, turbulence may not be generated sufficiently around the connecting portions 4 and it may lower heat dissipation of the connecting portions 4. When the depth t1 of the dimples 5 is more than 2 mm, rigidity of the connecting portions 4 reduces and it may bring deterioration in durability of the tire 1. More preferably, the depth t1 of the dimples 5 is in a range of from 5% to 15% of the thickness t2 of the connecting portion 4 in order to dissipate heat of the connecting portions 4 efficiently as well as to ensure rigidity of the connecting portions 4.

In order to further improve the advantageous effects described above, a ratio A/B of a total surface area A of the dimples 5 to a total virtual surface area B of the connecting portions 4 obtained by filling up all dimples 5 is in a range of not less than 10%, more preferably not less than 20%, but preferably not more than 80%, more preferably not more than 70%. In this specification, the surface area of each dimple 5 means a closed area surrounded by outer edge 5 of the dimple 5.

Preferably, the connecting portions 4 include a rough surface 10 at least partially. Since the rough surface 10 may further increase the surface area of the connecting portions 4, heat of the connecting portions 4 may be dissipated to the air efficiently. As for the process to obtain the rough surface 10, emboss process, satin process and the like are preferably employed. In this embodiment, the surface of the dimples 5 is also provided with the rough surface 10.

The rough surface 10 preferably has a surface roughness Ra of from 1 to 30 micrometer. When the surface roughness Ra of the rough surface 10 is less than 1 micrometer, it may be difficult to increase the surface area of the connecting portions 4 sufficiently. When the surface roughness Ra of the rough surface 10 is more than 30 micrometer, stress of tensile and compressive deformation during traveling may concentrate on the rough surface 10 and the surface may be cracked. More preferably, the surface roughness Ra of the rough surface 10 is in a range of from 2 to 20 micrometer.

In this specification, the surface roughness is identified as the arithmetic mean height of contour curve (the arithmetic mean height of roughness curve) according to JIS B 0601-(2001) "Geometrical Product Specifications (GPS)—Surface texture: Profile method—Terms, definitions and surface texture parameters".

Figure 4:
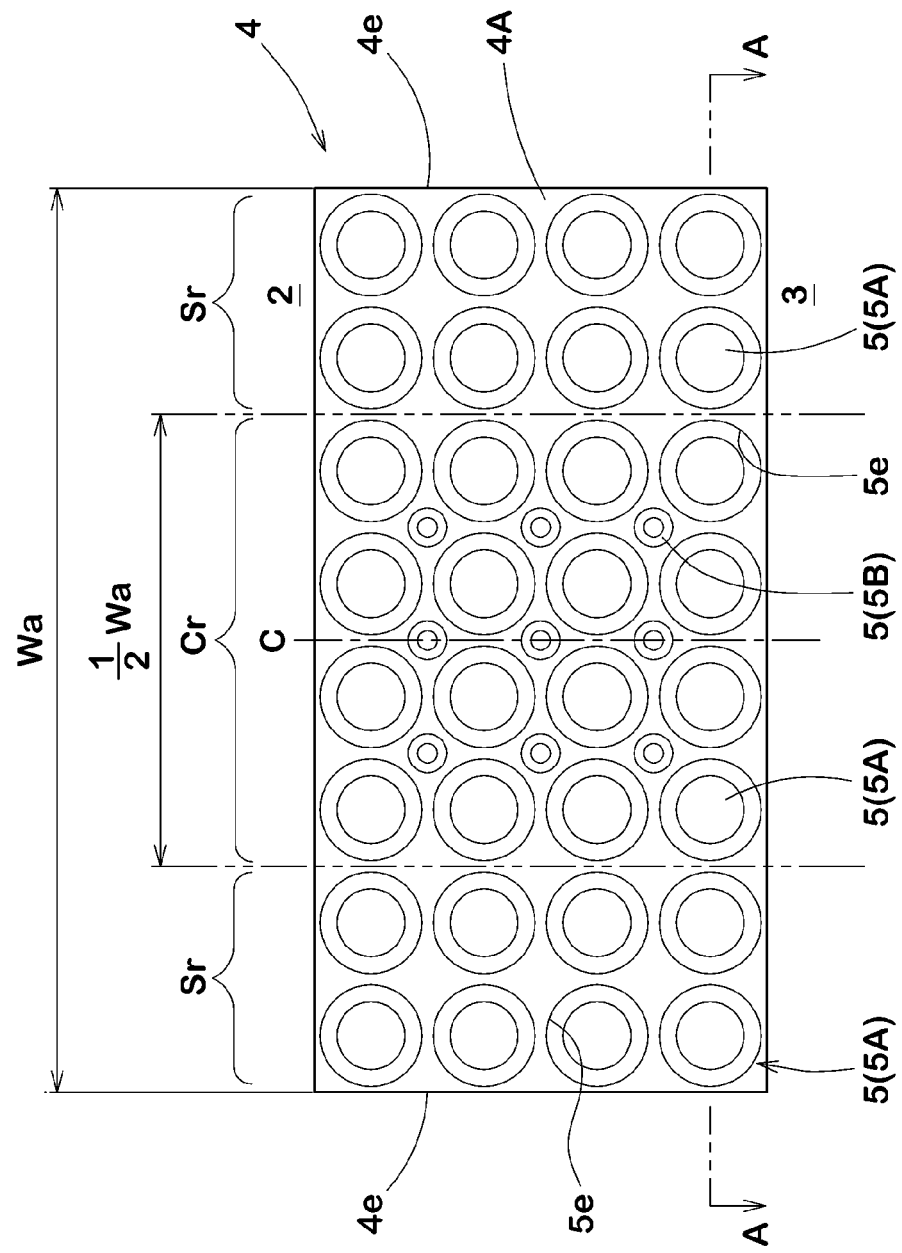
FIG. 4 is a front view of a connecting portion in accordance with another aspect of the invention.
Figure 5:
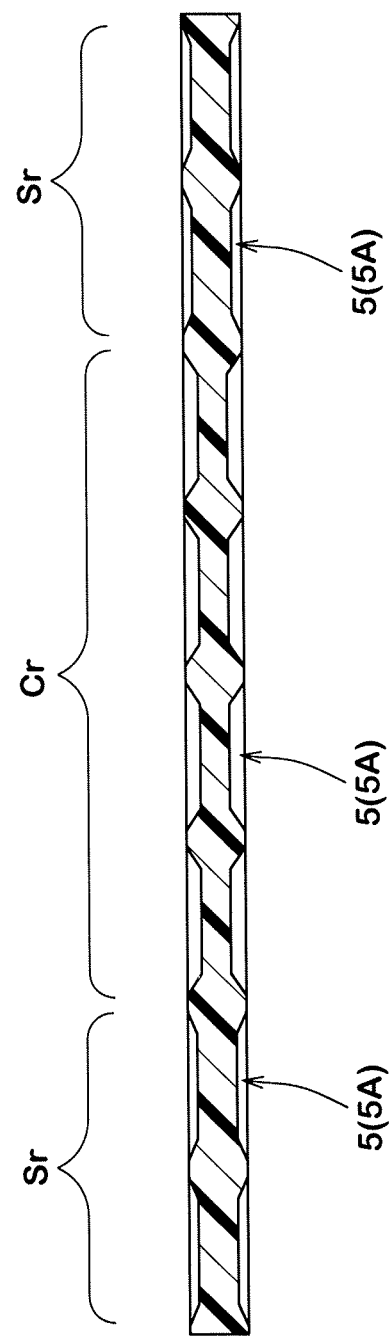
FIG. 5 is a cross-sectional view taken along lines A-A of FIG. 4.

FIG. 4 illustrates a front view of the connecting portion in accordance with another aspect of the invention. FIG. 5 illustrates a cross-sectional view taken along lines A-A of FIG. 4. As shown in FIG. 4, the outer surface 4A of each connecting portion 4 includes a central region Cr having a center corresponding to a tire equatorial plane C and a width being a half of the maximum width Wa of the connecting portion 4, and a pair of shoulder regions Sr each located between the central region Cr and a edge 4e of the connecting portion 4.

Each connecting portion 4 is sandwiched between the inner peripheral portion 3 and the tread portion 2 in the radial direction of the tire. The central region Cr of the connecting portion 4 is a region where heat thereof is difficult to be dissipated to the air in comparison with the shoulder regions Sr since the air around the central region Cr tends to stay. Thus, in the central region Cr, it is preferable that the ratio A/B, which refers to the dimple surface ratio, of the total surface area A of the dimples 5 to the total virtual surface area B of the connecting portions 4 obtained by filling up all dimples 5 is high. Furthermore, it is preferable that the dimple surface ratio of the shoulder region Sr is lower than that of the central region Cr in order to ensure durability of the tire 1 by suppressing reduction of rigidity of the connecting portions 4.

In order to further improve the advantageous effects described above, the dimple surface ratio of the central region Cr is preferably in a range of from 1.2 to 1.8 times the dimple surface ratio of the shoulder region Sr. In this embodiment, the central region Cr is provided with a first dimple 5A and a second dimple 5B having a diameter smaller than that of the first dimple 5A. The second dimple 5B is surrounded by a plurality of the first dimples 5A. Each shoulder region Sr is provided with only the first dimples 5A that are arranged in the same pitches as the central region Cr.

In the same point of view, the connecting portions 4 may be provided with the first dimples 5A having different depths. For example, the respective shoulder regions Sr may be provided with the first dimples that have shallow depth in comparison to the first dimples 5A of the central region Cr as shown in FIG. 5.

The Second Embodiment

Figure 6:
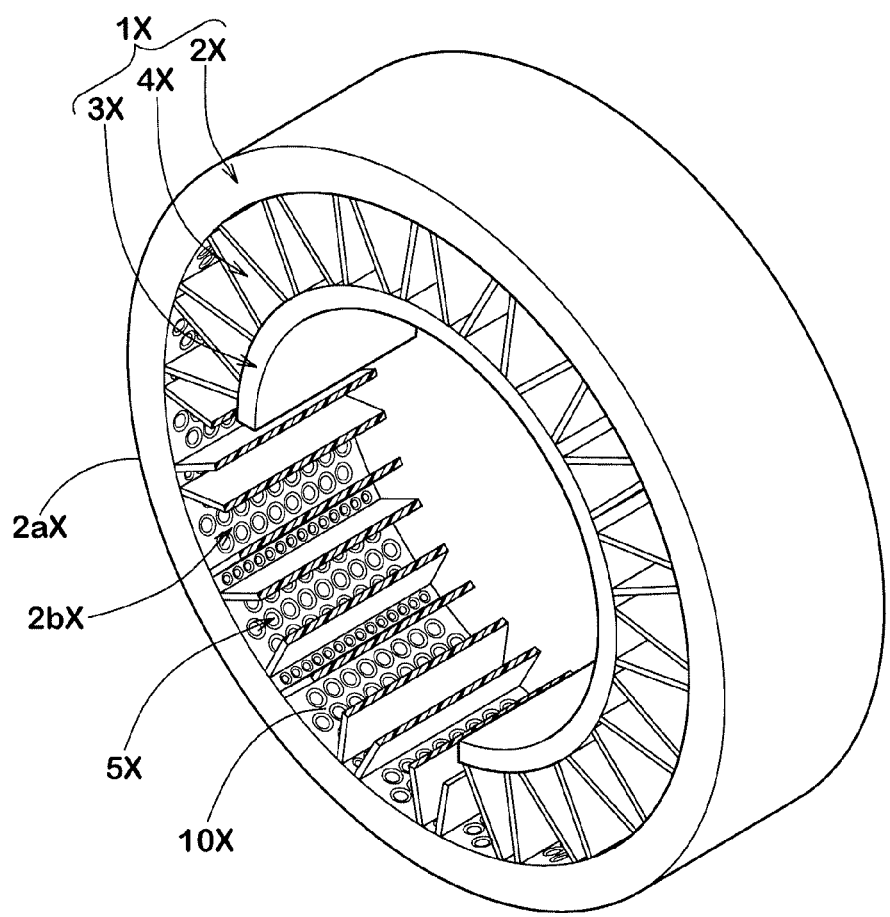
FIG. 6 is a perspective view of a non-pneumatic tire in accordance with a second embodiment of the present invention.
Figure 7:
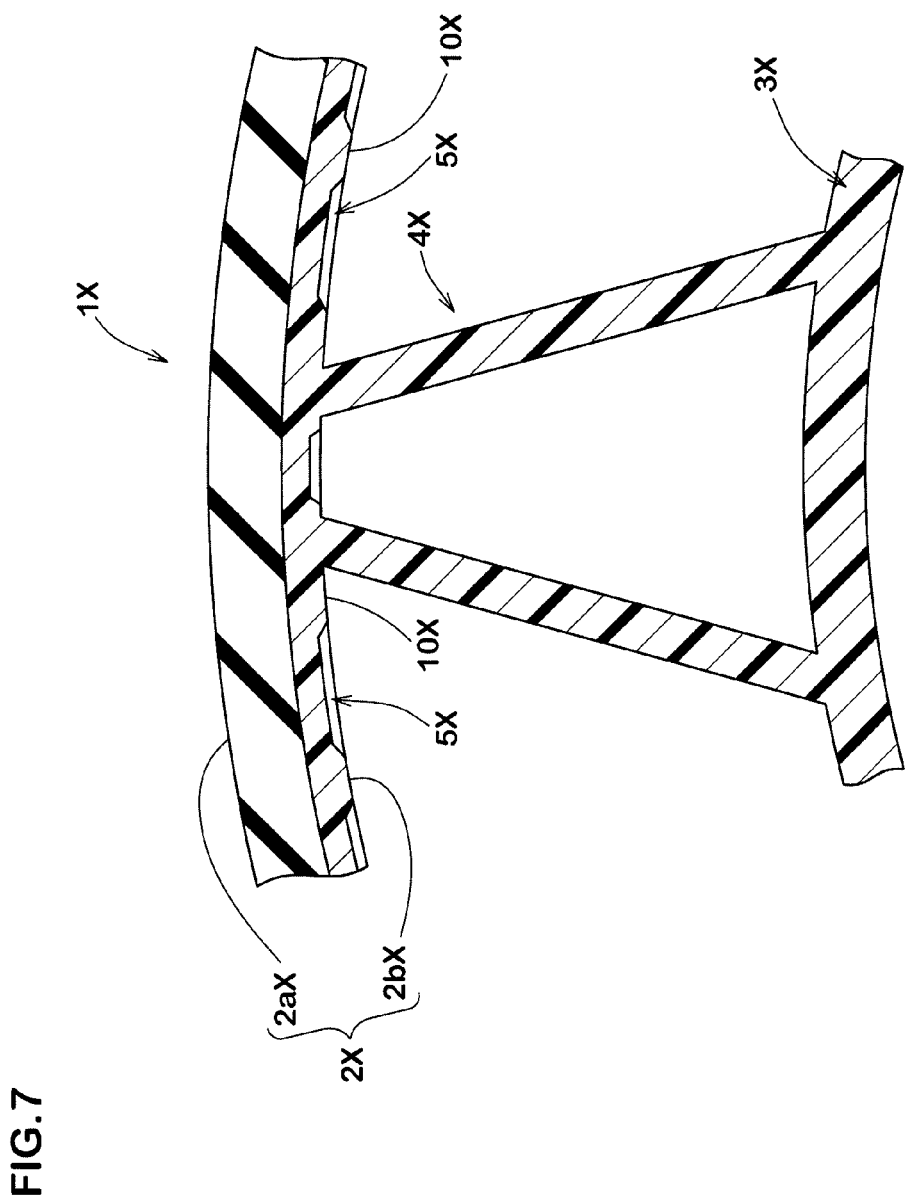
FIG. 7 is a partially enlarged cross-sectional view of the non-pneumatic tire of FIG. 6 cut along a circumferential direction of the tire.

FIG. 6 illustrates a perspective view of the non-pneumatic tire 1 in accordance with the second embodiment of the present invention. FIG. 7 illustrates a partially enlarged cross-sectional view of the non-pneumatic tire of FIG. 6 cut along a circumferential direction of the tire. In the second embodiment, like or the same elements as the first embodiment are denoted the reference signs with "X" at the end of the respective reference signs of the first embodiment. As shown in FIGS. 6 and 7, the tire 1X in accordance with the second embodiment includes the tread portion 2X that is provided with a plurality of dimples 5X on the tread inner surface 2bX. In this embodiment, heat generated from either the tread portion 2X or the connecting portions 4X due to hysteresis loss is dissipated through the tread inner surface 2bX with dimples 5X efficiently, thereby suppressing heat degradation of components of the tire.

In order to suppress heat degradation of the tire as well as to ensure sufficient rigidity of the tread portion 2X, a ratio C/D of a total surface area C of the dimples 5X on the tread inner surface 2bX to a total virtual surface area D of the tread inner surface 2bX obtained by filling up all dimples 5X is in a range of not less than 10%, more preferably not less than 20%, but preferably not more than 80%, more preferably not more than 70%.

Preferably, the tread inner surface 2bX includes the rough surface 10X described above at least partially as with the connection portions 4X. When the tread inner surface 2bX is divided into the central region and the pair of shoulder regions according to the definition described above, the dimple surface ratio of the central region of the tread inner surface 2bX (not shown) is preferably in a range of from 1.2 to 1.8 times the dimple surface ratio of each shoulder region of the tread inner surface 2bX (not shown).

The Third Embodiment

Figure 8:
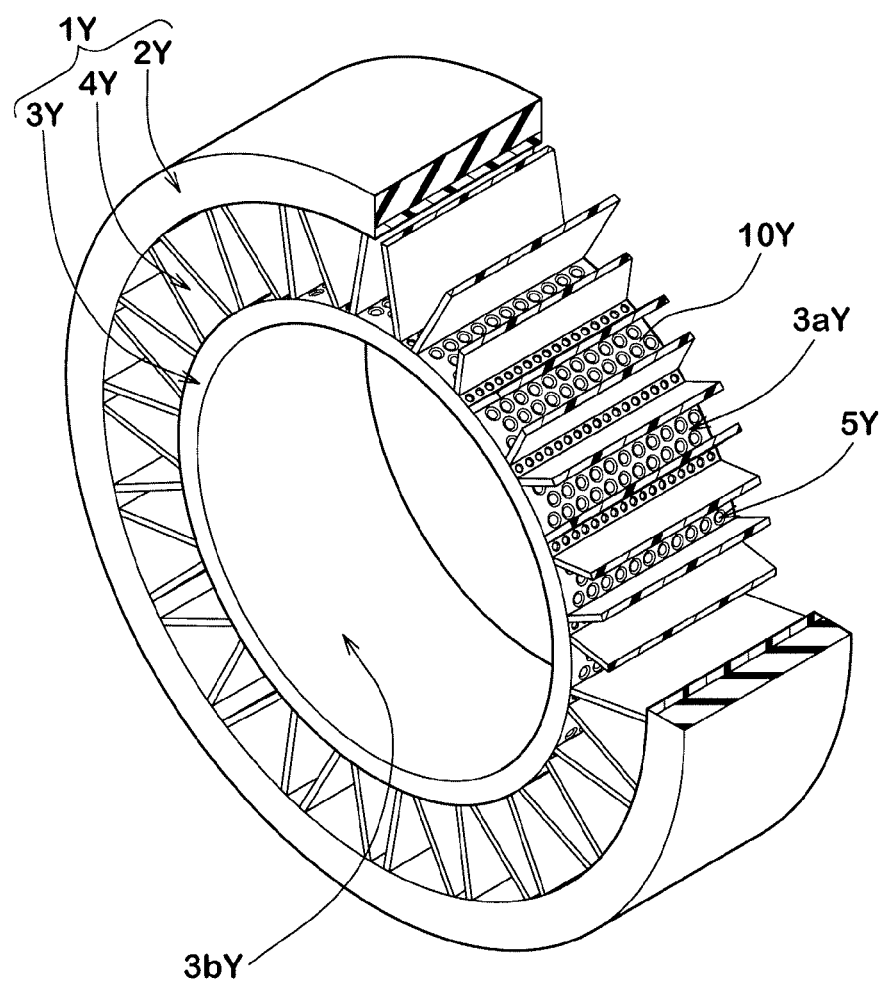
FIG. 8 is a perspective view of a non-pneumatic tire in accordance with a third embodiment of the present invention.
Figure 9:
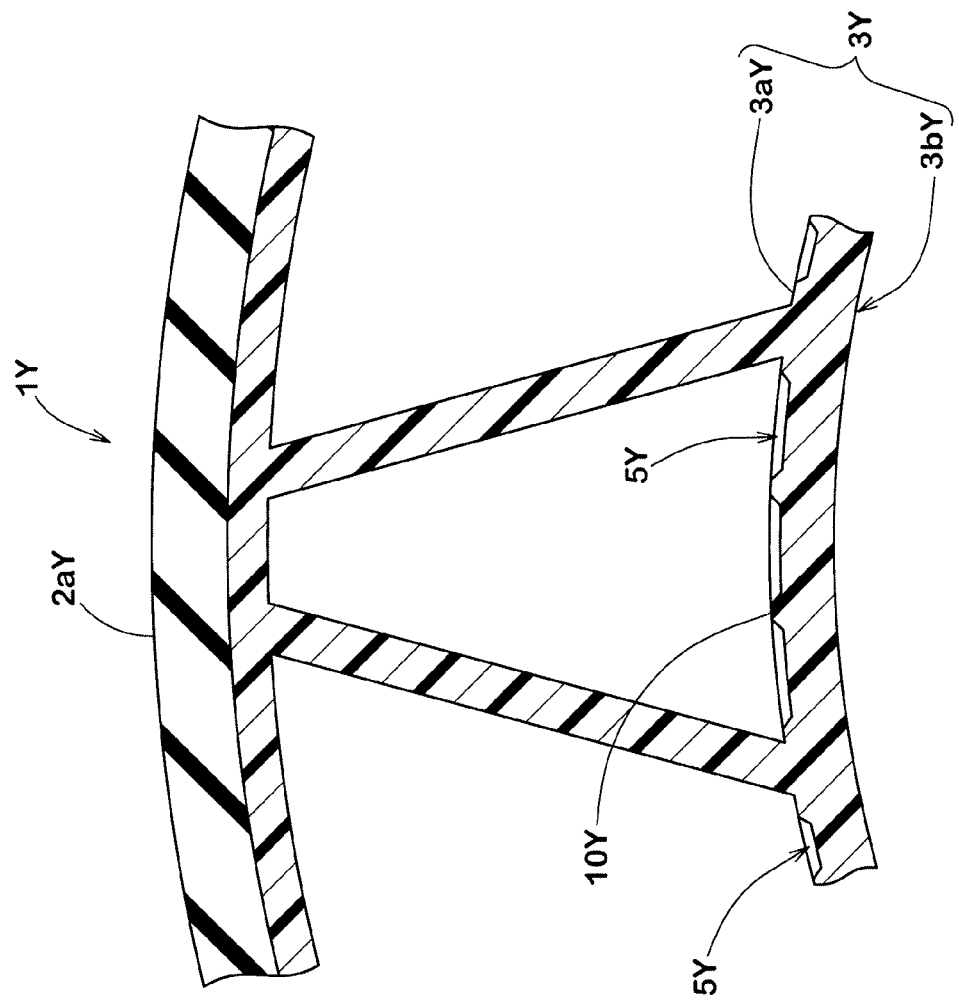
FIG. 9 is a partially enlarged cross-sectional view of the non-pneumatic tire of FIG. 8 cut along a circumferential direction of the tire.

FIG. 8 illustrates a perspective view of the non-pneumatic tire 1 in accordance with the third embodiment of the present invention. FIG. 9 illustrates a partially enlarged cross-sectional view of the non-pneumatic tire of FIG. 8 cut along a circumferential direction of the tire. In the third embodiment, like or the same elements as the first embodiment are denoted the reference signs "Y" at the end of the respective signs of the first embodiment. As shown in FIGS. 8 and 9, the tire 1Y in accordance with the third embodiment includes the inner peripheral portion 3Y that is provided with a plurality of dimples 5Y on the outer surface 3aY. In this embodiment, heat generated from either the inner peripheral portion 3Y or the connection portions 4Y due to hysteresis loss is dissipated through the outer surface 3aY of the inner peripheral portion 3Y with dimples 5Y efficiently, thereby suppressing heat degradation of components of the tire.

In order to further improve the advantageous effects, a ratio E/F of a total surface area E of the dimples 5Y on the outer surface 3aY of the inner peripheral portion 3Y to a total virtual surface area F of the outer surface 3aY obtained by filling up all dimples 5Y is in a range of not less than 10%, more preferably not less than 20%, but preferably not more than 80%, more preferably not more than 70%.

Preferably, the outer surface 3aY of the inner peripheral portion 3Y includes the rough surface 10 described above at least partially as with the connection portions 4Y. When the outer surface 3aY of the inner peripheral portion 3Y is divided into the central region and the pair of shoulder regions according to the definition described above, the dimple surface ratio of the central region of the outer surface 3aY (not shown) is preferably in a range of from 1.2 to 1.8 times the dimple surface ratio of each shoulder region of the outer surface 3aY (not shown).

While the particularly preferable embodiments of the non-pneumatic tire in accordance with the present invention have been described in detail, the present invention is not limited to the illustrated embodiments, but can be modified and carried out in various aspects.

Example 1

Non-pneumatic tires having a basic structure illustrated in FIG. 1 were manufactured based on Table 1, and then each tire was tested with respect to exothermic property. The common specifications of tires are as follows.
Outer diameter of tire Ha: 635 mm
Tread width W: 195 mm
Tread portion rubber polymer: Natural rubber and styrene-butadiene rubber
Tread portion plastic polymer: Thermosetting polyurethane composition
Inner peripheral portion composition: Thermosetting polyurethane composition
Connecting portion height Hb: 90 mm
Connecting portion width Wa: 185 mm
Connecting portion thickness t2: 3 mm
Connecting portion composition: Thermosetting polyurethane composition
Dimple surface area: 3.14 mm$^2$
Dimple depth t1: 0.3 mm
The test method is as follows.
Exothermic Property:
Each test tire was made to run on a drum tester under the following conditions. After running, average temperature of the connecting portions was measured using a thermal imaging device (surface thermometer). The test results are shown using an index based on Ref. 1 being 100. The smaller the value, the better the performance is.
Running distance: 10 km
Tire load: 4.55 kN
Running speed: 60 km/hr
The test results are shown in Table 1.

TABLE 1

|  | Ref. 1 | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| FIG. showing tire structure | FIG. 1 | FIG. 1 | FIG. 1 | FIG. 1 | FIG. 1 | FIG. 1 | FIG. 1 | FIG. 1 | FIG. 1 | FIG. 1 |
| Dimple shape | None | Circle | Rectangle | Triangle | Circle | Rectangle | Circle | Circle | Circle | Circle |
| Dimple surface ratio (%) | — | 50 | 50 | 50 | 50 | 50 | 5 | 10 | 80 | 85 |
| Rough surface existence and its surface roughness Ra (μm) | — | Presence 5.2 | Presence 5.2 | Presence 5.2 | None | None | Presence 5.2 | Presence 5.2 | Presence 5.2 | Presence 5.2 |
| Exothermic property (Index) | 100 | 90 | 94 | 94 | 92 | 97 | 98 | 95 | 95 | 96 |

From the test results, it is confirmed that the example tires had low exothermic property in comparison with the reference tire. This means that the example tires have improved durability to the example tire. Furthermore, other tests were conducted while changing depths and diameters of dimples. It also showed the same results as the above. In addition, excellent result was confirmed at the test using the tire having the connecting portions illustrated in FIG. 4.

Example 2

Non-pneumatic tires having a basic structure illustrated in FIG. 6 were manufactured based on Table 2, and then each tire was tested with respect to exothermic property. The common specifications of tires and the test method are the same as the Example 1. Furthermore, after running on the drum tester, presence of a crack on the tread inner surface was checked.

The test results are shown in Table 2.

TABLE 2

|  | Ref. 1 | Ex. 1 | Ex. 2 | Ex. 3 | Ex. 4 | Ex. 5 |
|---|---|---|---|---|---|---|
| FIG. showing tire structure | FIG. 6 | FIG. 6 | FIG. 6 | FIG. 6 | FIG. 6 | FIG. 6 |
| Dimple shape | None | Circle | Rectangle | Triangle | Circle | Circle |
| Dimple surface ratio (%) | — | 50 | 50 | 50 | 5 | 15 |
| Rough surface existence and | Presence | Presence | Presence | Presence | Presence | Presence |
| its surface roughness Ra (μm) | 5.2 | 5.2 | 5.2 | 5.2 | 5.2 | 5.2 |
| Exothermic property (Index) | 100 | 90 | 94 | 94 | 93 | 92 |
| Crack | None | None | None | None | None | None |

|  | Ex. 6 | Ex. 7 | Ex. 8 | Ex. 9 | Ex. 10 | Ex. 11 |
|---|---|---|---|---|---|---|
| FIG. showing tire structure | FIG. 6 | FIG. 6 | FIG. 6 | FIG. 6 | FIG. 6 | FIG. 6 |
| Dimple shape | Circle | Circle | Circle | Circle | Circle | Circle |
| Dimple surface ratio (%) | 75 | 85 | 50 | 50 | 50 | 50 |
| Rough surface existence and | Presence | Presence | None | Presence | Presence | Presence |
| its surface roughness Ra (μm) | 5.2 | 5.2 | 0.8 | 2.0 | 18 | 35 |
| Exothermic property (Index) | 92 | 93 | 92 | 91 | 90 | 92 |
| Crack | None | None | None | None | None | Presence |

From the test results, it is confirmed that the example tires had low exothermic property in comparison with the reference tire. This means that the example tires have improved durability to the example tire. The crack of Ex. 11 was a minor damage and there was no difficulty to run.

REFERENCE SIGNS LIST

2 Tread portion
3 Inner peripheral portion
4 Connecting portion
5 Dimple

The invention claimed is:

1. A non-pneumatic tire comprising:
an annular tread portion that comes into contact with a road;
an annular inner peripheral portion being located radially inwardly of the tread portion; and
a plurality of connecting portions connecting the tread portion with the inner peripheral portion, wherein the connecting portions have a plate-like shape extending in an axial direction of the tire, the connecting portions are spaced from one another in the circumferential direction of the tire, and at least one of the connecting portions is provided with a plurality of dimples.

2. The non-pneumatic tire according to claim 1, wherein a ratio A/B of a total surface area A of all the dimples to a total virtual surface area B of all of the surfaces of the connecting portions including all the dimples is in a range of from 10% to 80%.

3. The non-pneumatic tire according to claim 1, wherein the connecting portions comprises a rough surface having a surface roughness of from 1 to 30 micrometer at least partially.

4. The non-pneumatic tire according to claim 1, wherein the dimples have a depth of from 0.1 to 2 mm.

5. The non-pneumatic tire according to claim 1, wherein the dimples have a diameter of from 1 to 20 mm.

6. The non-pneumatic tire according to claim 1,
wherein each of the connecting portions includes a central region having a center corresponding to a tire equatorial plane and a width being a half of the maximum width of the connecting portion, and a pair of shoulder regions each located between the central region and a side edge of the connecting portion, and
each shoulder region has a dimple surface ratio lower than that of the central region, where the dimple surface ratio is a total surface area of the dimples provided on the concerned region to the total virtual surface area of all of the surfaces of the concerned region of the connecting portion including all the dimples.

7. The non-pneumatic tire according to claim 1,
wherein each of the connecting portions comprises a central region having a center corresponding to a tire equatorial plane and a width being a half of the maximum width of the connecting portion and a pair of shoulder regions each located between the central region and a side edge of the connecting portion, and
the shoulder regions are provided with some dimples having a depth shallower than that of the dimples provided on the central region.

8. The non-pneumatic tire according to claim 1, wherein the plurality of dimples comprise first dimples and second dimples, the second dimples having diameters smaller than those of the first dimples.

9. The non-pneumatic tire according to claim 8, wherein each of the connecting portions comprises a central region having a center corresponding to a tire equatorial plane and a width being a half of the maximum width of the connecting portion, and
the central region is provided with the first dimples and the second dimples.

10. The non-pneumatic tire according to claim 9, wherein each of the connecting portions comprises a pair of shoulder regions each located between the central region and a side edge of the connecting portion, and the shoulder regions are provided with only the first dimples.

11. The non-pneumatic tire according to claim 10, wherein the first dimples are arranged with same pitches in the central region and the shoulder regions.

12. The non-pneumatic tire according to claim 9, wherein each of the second dimples is surrounded by a plurality of the first dimples.

13. The non-pneumatic tire according to claim 8, wherein each of the second dimples is surrounded by a plurality of the first dimples.

* * * * *